United States Patent [19]

Martenson

[11] 4,448,916

[45] * May 15, 1984

[54] RESIN ANTISTATIC AND STRENGTHENING COMPOSITION

[75] Inventor: Irvin W. Martenson, Brea, Calif.

[73] Assignee: American Organics Corp., Placentia, Calif.

[*] Notice: The portion of the term of this patent subsequent to Jul. 27, 1999 has been disclaimed.

[21] Appl. No.: 217,175

[22] Filed: Dec. 16, 1980

[51] Int. Cl.$^3$ .......................... C08K 5/20; C08K 5/42; D06M 13/46
[52] U.S. Cl. ............................... 524/106; 106/308 F; 106/308 N; 252/8.75; 252/8.8; 252/315.2; 260/DIG. 20; 524/913
[58] Field of Search ................. 252/8.75, 8.8, 316, 252/315.2; 260/DIG. 20; 524/106, 913

[56] References Cited

U.S. PATENT DOCUMENTS

| | | | |
|---|---|---|---|
| 3,215,486 | 11/1965 | Hada et al. | 260/DIG. 20 |
| 3,445,385 | 5/1969 | Vartanian | 252/8.8 |
| 3,681,241 | 8/1972 | Rudy | 252/8.75 |
| 3,954,634 | 5/1976 | Monson et al. | 252/8.75 X |
| 4,144,367 | 3/1979 | Landucci | 252/8.75 X |
| 4,157,307 | 6/1979 | Jaeger et al. | 252/8.8 X |
| 4,338,204 | 7/1982 | Spadini et al. | 252/8.8 X |
| 4,341,565 | 7/1982 | Martenson | 106/308 N X |

*Primary Examiner*—Richard D. Lovering
*Attorney, Agent, or Firm*—Robert E. Strauss

[57] ABSTRACT

There is disclosed a liquid gel composition useful for incorporation in thermoplastic and thermosetting resins. The liquid gel comprises a liquid mixture of certain hydroxyalkyl fatty amines or fatty imidazolium quaternaries which is gelled by an organophilic, expanding lattice clay that is ion exchanged with alkyl ammonium ions. The clay is employed at a sufficient concentration to form a stable gel and is milled into the liquid vehicle to form a gel of a suitable viscosity to permit it to be added to the resin with metering injection equipment. The composition when used at low concentrations in resins enhances the physical properties of the resins by imparting a permanent anti-static characteristic to the resins and by significantly decreasing their brittleness, thereby increasing elongation, impact and tensile strengths of the resins. Solid, subdivided colorants can also be blended into the liquid gel composition at a concentration from 10 to about 70 weight percent of the resultant mixture, thereby providing a liquid colorant composition to color the resins and improve their physical properties with a single composition.

11 Claims, No Drawings

RESIN ANTISTATIC AND STRENGTHENING COMPOSITION

BACKGROUND OF THE INVENTION

1. Field of Invention

This invention relates to compositions for plastics and, in particular, to compositions which enhance the physical properties of plastics.

2. Brief Statement of the Prior Art

The characteristic of plastics to acquire and hold a static charge creates problems in handling and use of molded and extruded products, particularly when these products are sheets or films. Some attempts have been made to obviate these problems by forming sheets and films with corrugated surfaces or by coating plastic surfaces with certain anti-static compounds which dissipate electrical static charges. Certain hydroxyalkyl fatty amines are among many compounds which have been tried as anti-static coatings for plastic products.

The coating of plastics requires an additional treatment during fabrication of products and the coatings only provide a temporary solution to the problem since they are ultimately worn from the surface during the life of the product. Improvements in the anti-static treatment or modification of plastics is, therefore, desired.

Small capacity, high pressure injection and metering pumps have been developed for incorporating liquid suspensions of pigments in plastics during injection and blow molding, extruding and pelletizing. While this approach avoids the hazardous dusts, inhalation toxicity, contamination and cleanup problems which are encountered with dry pigments, difficulty has been experienced in providing a liquid suspension of pigments that has a stable and sufficient viscosity for use with these pumps.

BRIEF DESCRIPTION OF THE INVENTION

This invention comprises a liquid gel composition of certain hydroxyalkyl fatty amines and fatty imidazolium quaternaries which has a stable viscosity, sufficient to permit use of presently available injection equipment such as high pressure metering pumps, to inject controlled amounts of the composition into admixture with resins during molding, extruding or pelletizing of the resins. The composition mixture, when used as low concentrations from about 0.05 to about 5.0 weight percent, has been found to impart a permanent anti-static characteristic to plastic products and to significantly improve their physical properties such as flexibility, elongation, and impact and tensile strengths.

It has also been found that the liquid gel composition of the invention is an ideal vehicle for pigments which have been used to color plastic products. The solid pigments can be retained in suspension in the liquid gel for prolonged periods, providing a liquid gel composition and colorant that is resistant to settling and to viscosity changes. The liquid gel composition can be used to improve the physical properties of resins and to color the finished products, thereby achieving both results with a single composition which can be introduced during the molding, extruding or pelletizing of the resins. When pigments are included in the liquid gel, they can be incorporated at concentrations of from 10 to about 70 weight percent of the final composition.

The liquid gel composition is prepared by mixing from about 0.1 to about 5.0 weight percent of an organophilic, expanding lattice clay with a mixture of certain hydroxyalkyl fatty amines and fatty imidazolium quaternaries and milling the resultant mixture to form a gel of the desired viscosity, typically from 2,000 to about 15,000 centipoise seconds, Brookfield. When solid pigments are to be suspended in the gel to provide also a colorant composition, the milling step is interrupted before the resulting gel achieves its maximum viscosity, typically when the gel has a viscosity from about 1,000 to about 3,000 centipoise seconds. The pigments in a finely subdivided state, typically from 0.05 to about 25 microns average particle diameter are then blended into the gel and the resultant mixture is thereafter milled to the desired final viscosity, typically from 2,000 to about 15,000 centipose seconds.

DESCRIPTION OF PREFERRED EMBODIMENTS

This invention comprises a liquid gel composition of a mixture of certain hydroxyalkyl fatty amines and fatty imidazolium quaternaries which is stable and resistant to change in viscosity. The invention also includes incorporating pigments, in the liquid gel, when desired, thereby providing a liquid colorant composition. The liquid colorant composition can include substantially all pigments and color bodies such as organic and inorganic pigments and special colorants such as fluorescent, phosphorescent, pearlescent, and metallic pigments.

The major ingredients of the liquid gel composition and its original ingredients are set forth in the following table:

TABLE 1

| Liquid Gel Ingredient | Broad Weight Percent | Preferred Weight Percent |
|---|---|---|
| Amine | 70-90 | 75-85 |
| Imidazolium quaternary | 10-30 | 15-25 |
| Organoclay | 0.1-10 | 0.2-3 |

When pigments are incorporated in the liquid gel composition, they can be added at relatively high concentrations as set forth in the following table:

TABLE 2

| Liquid Colorant Ingredients | Broad Weight Percent | Preferred Weight Percent |
|---|---|---|
| Liquid Gel | 90-30 | 45-65 |
| Pigment | 10-70 | 55-35(1) |
| Gloss Agent(2) | 0.0001-0.01 | 0.00015-0.001 |

(1)With carbon black, the preferred range is 12-15 percent
With metallics, the preferred range is 14-20 percent
(2)Optional ingredient The amines which are used in the liquid gel composition mixture are hydroxyalkyl long chain aliphatic (fatty) amines having the following formula:

$$(OHR_1)_n\text{---}NH_{(2-n)}R_2$$

wherein:

$R_1$ is a $C_1$ to $C_8$ alkylene such as methylene, ethylene, propylene, butylene, pentylene, octylene, etc.;

$R_2$ is a $C_{10}$ to $C_{22}$ aliphatic group such as decyl, oleyl, palmyl, stearyl, myristyl, linoleyl, etc.; and n is 1 or 2.

These compounds are commonly derived from animal and vegetable fats and oils and are accordingly referred to by source, e.g., hydroxyalkyl derivatives of coco amine, tallow amine, etc.

Suitable compounds are N-hydroxyethyl coco amine, N,N-bis-hydroxyethyl coco amine, N,N-bis-hydroxyethyl tallow amine, hydroxypropyl oleylamine, N,N-bis-hydroxybutyl linoleyl, etc. The preferred class of these cs are the N,N-bis-compounds, wherein n is equal to 2 in the above formula.

The imidazolinium quaternaries which are used in the liquid gel composition have the general formula:

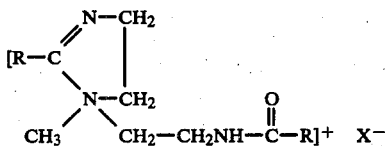

wherein:

R is a $C_{10}$ to $C_{22}$ aliphatic group such as decyl, oleyl, palmyl, stearyl, myristyl, linoleyl, etc.; and X is $C_1$ to $C_5$ alkyl sulfate such as methyl sulfate, ethyl sulfate, propyl sulfate, isopropyl sulfate, etc., such as methyl sulfate, ethyl sulfate, propyl sulfate, isopropyl sulfate, etc.

Examples of suitable compounds in this class are:

methyl-1-hydrogenated tallow amido ethyl-2-hydrogenated tallow imidazolinium-methyl sulfate;

methyl-1-tallow amido ethyl-2-tallow imidazolinium-methyl sulfate;

methyl-1-oleyl amido ethyl-2-oleyl imidazolinium-methyl sulfate; and 1-ethylene bis (2-tallow, 1-methyl, imidazolinium methyl sulfate).

The aforementioned amines and quaternaries are employed in proportions of from 70 to 90 weight percent amine and from 10 to 30 weight percent quaternary. Lesser proportions of the quaternary fail to provide the desired enhancement of the physical properties of the resins while greater proportions of the quaternary soften the resins excessively.

The mixture of the aforementioned amines and imidazolium quaternaries is formed into a gel by incorporating an organophilic clay into the liquid mixture under high shear conditions. Useful clays are swelling or expanding lattice clays such as found in Wyoming, South Dakota, Montana, Utah, Nevada and California. These expanding lattice clays include montmorillonite, vermiculite, nontronite, saponite, hectorite, etc., all having a three layer crystal. These clays are commonly found in admixture in bentonite clays having an average aluminum oxide content less than about 20 weight percent. The bentonite clays also have a high ion exchange capacity, commonly between about 50 and 150 milliequivalents, per 100 grams of the air-dried clay.

The aforedescribed clays are usually found in a form wherein the ion exchange sites are occupied with alkali and/or alkaline earth metals. The clays can be ion exchanged with an alkyl ammonium compound to form the organophylic clay or can be treated to exchange the alkali or alkaline metals with hydrogen and the resultant hydrogen substitution is accomplished simply by acid washing the solid clay using a dilute mineral acid such as hydrochloric, nitric or sulfuric acid, and separating the solid from the acid by settling or filtering. A suspension of the clay can also be converted to the hydrogen form by passing the suspension over a hydrogen charged ion exchange solid such as Amberlite and the resultant aqueous suspension of hydrogen clay can be reacted with the alkylamine. The organophylic clays are also commercially available from a number of sources, one class is designated as Bentone, available from National Lead Company.

The alkylammonium groups which are ion exchanged onto the clay can be mono, di, tri or tetra-alkyl ammonium ions wherein the alkyl groups have from one to about twelve carbons. Examples of suitable ammonium ions for preparation of an organophyllic clay are tetramethyl ammonium ion, 2-ethylhexyl ammonium ion, triethyl ammonium ion, dioctyl ammonium ion, tetrabutyl ammonium ion, etc.

The organophylic clay is employed in a finely subdivided state, typically in a powder form having a partical diameter passing a 20 mesh and retained on about 325 mesh Standard screen.

The powdered organophilic clay is mixed with the liquid mixture of amines and imidazolinium quaternaries in the desired proportion and the resulting mixture is subjected to high shear forces, preferably by passing the mixture through a conventional blending mill. During the milling of the mixture, it will be observed that the viscosity of the mixture increases, reflecting the formation of a gel. The resultant gel is milled for sufficient time to raise its viscosity to the desired value that is compatible with the high pressure injection metering pumps used with molding, extruding or pelletizing equipment. These pumps typically require a liquid having a viscosity from about 3,000 to 15,000 centipoise seconds.

In instances when the resin is to be colored, the pigment can also be included in the liquid gel composition, thereby providing a single colorant composition which also improves the physical properties of final products. When pigments are to be added to the liquid gel, the mixture of the clay and amines and imidazolinium quaternary is not milled to its mixture viscosity but, instead, the milling operation is interrupted when the viscosity of the mixture reaches a value from about 1,000 to 3,000 centipoise seconds, Brookfield. The resultant gel is thereafter blended with the pigments to be employed in the liquid gel composition.

The pigments which can be employed in the liquid gel compositions can be organic or inorganic finely subdivided solids. The inorganic pigments include oxides and salts of metals such as titanium, iron, lead, zinc, cadmium, mercury, chromium, molybdenum, etc. Titanium dioxide in both anatase and rutile crystal form is the predominately used white pigment. Iron oxides are used for red, brown and tan colors; lead chromate is used for yellow, lead molybdates for orange, red, and related colors, and mixtures can be prepared for varied shades of orange. Lead chromate is also combined with iron blue (ferric ferrocyanide) to prepare green colors. The cadmium salts and oxides are used for red, maroon and yellow shades and other salts include the aluminates such as cobalt aluminate or titanates such as chromium titanate.

Organic pigments which are used in the invention are the conventional organic pigments employed in molding resins, including azo compounds which have one or two azo linkages to provide orange, yellow and red pigments. The azo groups are typically in aromatic compounds which include napthol or toluidine groups. Some of the azo pigments include chelate metals, eg, chelated nickel yellow. Another class of organic pigments are the phthalocyanine greens and blues. Colors of red, maroon, and violet can be obtained with the quinacridone pigments. The isoindolinones are a group of pigments in the red to yellow color range. The anthraquinones such as anthraquinone red, indathrone blue, anthra pyrimidine yellows are also suitable for use in the invention.

Carbon black is widely used as a pigment for a black coloration and typically carbon blacks are effective at relatively low concentrations and are available in a very finely subdivided state for use in the invention.

Special color effects can also be imparted in the liquid gel compositions. These special effects include the metallics in which finely subdivided metal powders such as aluminum and aluminum alloys are used to produce brillant blue-white highlights and copper and copper alloys with zinc are used to produce gold and bronze highlights. These can be admixed with dyes or organic or inorganic pigments to impart a metallic luster to the molded products. Pearlescent effects can be also achieved using lead carbonate or other commercially available pearlescent colorants in combination with other pigments.

The pigments are employed in a finely subdivided state, typically having particle diameters from 0.05 to about 25 microns, preferably from 0.5 to about 15 microns. Carbon blacks are usually in the most subdivided state, typically with particle diameters from about 0.05 to about 10 microns and the inorganic pigments including the metallics are usually in the size range with average particle diameters from 1 to about 10 microns. The pigments are employed at the maximum solid concentrations possible for the desired final viscosity. The actual concentration varies somewhat with the density and identity of the particular pigment; generally the range is from 45 to about 75 weight percent solids for the inorganic and organic pigments and is from 9 to about 15 weight percent, preferably from about 10 to 12 weight percent for carbon black.

The solid pigments are incorporated in the liquid gel compositions by mixing the pigment with the pre-gel and milling the resultant admixture under high shear forces to thoroughly blend and admix the pigments. This milling results in an increase in the viscosity of the liquid from the range of about 1,000–2,000 centipoise seconds in the final product. The final density varies somewhat for the particular injection pump which is to be used for the metered injection of the liquid gel composition into the molding system. Various metering pumps are available, however, a particularly useful injection pump is that marketed by the RS Corcoran Company, New Lennox, Ill. and, for this pump it is desirable to have viscosity of the final product at a value from 5,000 to 9,000 centipoise seconds.

Another ingredient which can be employed in the liquid gel composition to achieve a desirable high gloss finish on the molded products is silicon fluid such as a polydialkylsiloxane, which has the formula:

$$(R_1)_3SiO[(R_1)_2SiO]_xSi(R_1)_3$$

wherein:

$R_1$ is a $C_1$ to $C_5$ alkyl, e.g., methyl, ethyl, isopropyl, butyl, etc.; and x is from 1 to 10, preferably from 1 to 4.

An example of a preferred silicon fluid is polydimethylsiloxane. The silicon fluid aids in a mold release of the finished product from the mold and in addition, imparts a luster or a gloss to the product. The silicon fluid is typically used at a concentration from 0.0001 to 0.01, preferably from 0.00015 to about 0.001 weight percent of the colorant composition.

The following examples will serve to illustrate a mode of practice of the invention and to demonstrate results obtainable thereby.

EXAMPLE 1

A liquid gel composition is prepared by blending together 408 weight parts of N,N-bis-hydroxyethyl coco amine, 200 weight parts of N, N-bis hydroxyethyl tallow amine, and 4 parts by weight of Bentone 38, a commercially available tetra-alkyl ammonium smectite. These ingredients are thoroughly mixed on a mill to a viscosity of approximately 5,000 centipoise seconds, Brookfield. The resultant gel is extremely stable and can be stored for long periods of time without any appreciable changes in its viscosity. The liquid gel composition is injected into admixture with Nylon resin during extrusion of the resin into film having a thickness of 0.005 inch. The resultant film is found to have a permanent anti-static characteristic and enhanced elongation and tensile strengths.

EXAMPLE 2

A liquid gel, green-colorant composition is prepared by blending approximately 1.5 parts by weight of the organo expanding lattice clay (Bentone 38), 262 parts by weight of N,N-bis-hydroxyethyl coco amine and 431 weight parts of N,N-bis hydroxyethyl tallow amine. The resulting mixture is milled for about 15 minutes to produce a thoroughly admixed composition having a viscosity of approximately 1,000 centipoise seconds, Brookfield. Thereafter, 274 parts by weight of a blue pigment and 187 parts by weight of a yellow pigment are added. The resulting mixture is milled to obtain a final product having a viscosity of approximately 9,000 centipoise seconds, Brookfield. The color concentrate is used for coloring films of Nylon 66 resin by injecting the colorant at a concentration of 0.5 weight percent into admixture with the resin during extrusion of the resin into film having a thickness of 0.005 inch. The color composition readily disperses into the resin during the molding to produce a uniformly colored product which resists static charges. Strength tests were performed on the products, including standard tensile strength and elongation tests, and these tests revealed that the tensile strength and elongation of the film increased about 20 percent over the films formed using the resin without the composition. The films of Nylon resin containing the liquid gel composition also have a greater high temperature strength than films of Nylon without the liquid gel. Even after 18 hours at 350 degrees F. the films with the liquid gel composition retain 80% of their original strengths, whereas films of the Nylon resins without the liquid gel composition rapidly lose their strengths at this temperature.

Another significant improvement which is observed is that the Nylon resin containing the gel composition do not build up on the lip of the extrusion dies during fabrication whereas Nylon resins without the liquid gel composition form a build up of resin on the extrusion dies.

EXAMPLE 3

The liquid gel composition described in the preceding example is used to color polyethylene terephthalate by injection of the composition at a concentrate of 0.75 weight percent into the resin during molding of the resin. Molded products which are obtained are observed to have a 25 percent increase in impact strength over the same products molded from resin without the liquid gel composition.

The liquid gel compositions in the invention have been observed to be extremely stable, and resist settling or viscosity changes even upon prolonged storage. The liquid gel compositions can be used directly without stirring even when large amounts of pigments are included, thereby avoiding the possibility of including air bubbles in the suspension. The molded products obtained from use of the liquid gel compositions have significantly improved impact and tensile strengths, improved elongation properties and a permanent anti-static property. The products formed with injection of the colorants are of uniform coloration and do not discolor or weep. The liquid gel compositions and colorants can be used in high temperature molding operations such as the molding of polycarbonate resins. Examination of molded products from resins such as polypropylene and polyethylene reveals that the lines of stress in the products show greater alignment along the extrusion direction with reduced random directions of stress. Furthermore, the liquid gel compositions and/or colorants of the invention can be used with all presently known commercial molding resin systems.

The invention has been described with reference to the illustrated and presently preferred embodiments. It is not intended that the invention be unduly limited by this description of the presently preferred embodiments. Instead, it is intended that the invention be defined by the ingredients and steps and their obvious equivalents set forth in the following claims.

What is claimed is:

1. A resin composition consisting essentially of a synthetic resin having uniformly dispersed therein from 0.05 to 5 weight percent of stable liquid gel composition consisting essentially of:
   (a) from about 70 to 90 weight percent of a fatty amine derivative of the formula:

$(OHR_1)_n-NH_{(2-n)}-R_2[(OHR_1)_n-NH-R]$ wherein:
   $R_1$ is a $C_1$ to $C_8$ alkylene
   $R_2$ is a $C_{10}$ to $C_{22}$ alkyl; and
   n is 1 or 2; and
   (b) from 10 to about 30 weight percent of a fatty imidazolinium quaternary of the formula:

$$[R-C\underset{\underset{CH_3}{\diagdown}\underset{CH_2-CH_2NH-\overset{O}{\overset{\|}{C}}-R]^+}{\diagup}}{\overset{\diagup N=CH_2}{\underset{\diagdown N-CH_2}{}}} \quad X^-$$

wherein:
   R is a $C_{10}$ to $C_{22}$ alkyl; and
   X is $C_1$ to $C_5$ alkyl sulfate; and
   (c) a gelling agent in an amount from 1 to about 5 percent of the weight of said liquid gel and comprising an organophilic, expanding lattice clay ion exchanged with alkyl quaternary ammonium ions.

2. The composition of claim 1 wherein said fatty amine is N,N-bis-hydroxyethyl coco amine.

3. The composition of claim 1 wherein said fatty amine is N,N-bis-hydroxyethyl tallow amine.

4. The composition of claim 1 wherein said quaternary is methyl-1-hydrogenated tallow amido ethyl-2-hydrogenated tallow imidazolinium-methyl sulfate.

5. The composition of claim 4 including from 0.0001 to 0.01 weight percent of a polydialkylsiloxane.

6. The method of preparing a stable liquid gel composition having the property of imparting an anti-static property to a synthetic resin when incorporated in such resin, consisting essentially of:
   (a) admixing from 1 to about 5 weight percent of an organophilic, expanding lattice clay having its ion exchange sites occupied by mono- and poly-alkyl ammonium ions with a liquid mixture of:
   (i) from about 60 to 90 weight percent of a fatty amine derivative of the formula:

$(OHR_1)_n-NH_{(2-n)}-R_2[(OHR_1)_n-NH-R]$ wherein:
   $R_1$ is a $C_1$ to $C_8$ alkylene
   $R_2$ is a $C_{10}$ to $C_{22}$ alkyl; and
   n is 1 or 2; and
   (ii) from 10 to about 30 weight percent of a fatty imidazolinium quaternary of the formula:

$$[R-C\underset{\underset{CH_3}{\diagdown}\underset{CH_2-CH_2NH-\overset{O}{\overset{\|}{C}}-R]^+}{\diagup}}{\overset{\diagup N-CH_2}{\underset{\diagdown N-CH_2}{}}} \quad X^-$$

wherein:
   R is a $C_{10}$ to $C_{22}$ alkyl; and
   X is $C_1$ to $C_5$ alkyl sulfate; and
   (b) milling said mixture to form a gel having a viscosity from 3,000 to about 15,000 centipoise seconds Brookfield.

7. The method of claim 6 wherein said amine is a N,N-bis-hydroxyalkyl amine of the aforesaid structure.

8. The method of claim 6 wherein said amine is N,N-bis-hydroxyethyl coco amine.

9. The method of claim 6 wherein said amine is N,N-bis-hydroxyethyl tallow amine.

10. The method of claim 9 including the step of adding to said composition from 0.0001 to 0.01 weight percent of a polydialkylsiloxane.

11. A stable liquid gel consisting essentially of:
    (a) from about 70 to 90 weight percent of a fatty amine derivative of the formula:

$(OHR_1)_n-NH_{(2-n)}-R_2[(OHR_1)_nNH-R]$ wherein:
    $R_1$ is a $C_1$ to $C_8$ alkylene
    $R_2$ is a $C_{10}$ to $C_{22}$ alkyl; and
    n is 1 or 2; and
    (b) from 10 to about 30 weight percent of a fatty imidazolinium quaternary of the formula:

$$[R-C\underset{\underset{CH_3}{\diagdown}\underset{CH_2-CH_2NH-\overset{O}{\overset{\|}{C}}-R]^+}{\diagup}}{\overset{\diagup N-CH_2}{\underset{\diagdown N-CH_2}{}}} \quad X^-$$

wherein:
    R is a $C_{10}$ to $C_{22}$ alkyl; and
    X is $C_1$ to $C_5$ alkyl sulfate; and
    (c) a gelling agent in an amount from 1 to about 5 percent of the weight of said liquid gel and comprising an organophilic, expanding lattice clay ion exchanged with alkyl quaternary ammonium ions.

* * * * *